US011465295B2

(12) United States Patent
Nagasaka et al.

(10) Patent No.: US 11,465,295 B2
(45) Date of Patent: Oct. 11, 2022

(54) MULTIPLEX DEVICE, ROBOT, AND METHOD FOR SWITCHING CONNECTION OF MULTIPLEX DEVICE

(71) Applicant: FUJI CORPORATION, Chiryu (JP)

(72) Inventors: Nobuo Nagasaka, Okazaki (JP); Hidekazu Kanai, Chiryu (JP); Kenji Watanabe, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 376 days.

(21) Appl. No.: 16/758,966

(22) PCT Filed: Oct. 26, 2017

(86) PCT No.: PCT/JP2017/038711
§ 371 (c)(1),
(2) Date: Apr. 24, 2020

(87) PCT Pub. No.: WO2019/082334
PCT Pub. Date: May 2, 2019

(65) Prior Publication Data
US 2020/0324418 A1    Oct. 15, 2020

(51) Int. Cl.
*B25J 13/00* (2006.01)
*H04L 12/28* (2006.01)
(Continued)

(52) U.S. Cl.
CPC .............. *B25J 13/006* (2013.01); *B25J 13/00* (2013.01); *H04L 12/2801* (2013.01);
(Continued)

(58) Field of Classification Search
CPC ... H04L 12/46; H04L 12/2801; H04L 49/602; H04L 69/08; B25J 13/00; B25J 13/006
See application file for complete search history.

(56) References Cited

U.S. PATENT DOCUMENTS 11,348,269 B1 * 5/2022 Ebrahimi Afrouzi ......................
G01S 7/4804
2015/0019013 A1 * 1/2015 Rose .................... B25J 9/1612
702/41
(Continued)

FOREIGN PATENT DOCUMENTS

| JP | 2001-320741 A | 11/2001 |
|----|---------------|---------|
| JP | 2016-151851 A | 8/2016 |
| WO | WO 2016/088214 A1 | 6/2016 |

OTHER PUBLICATIONS

International Search Report dated Nov. 28, 2017 in PCT/JP2017/038711 filed Oct. 26, 2017.

*Primary Examiner* — Melanie Jagannathan
(74) *Attorney, Agent, or Firm* — Oblon, McClelland, Maier & Neustadt, L.L.P.

(57) ABSTRACT

A multiplex device including a multiplex connecting section connected to a movable side multiplex device, the multiplex connecting section being configured to transmit a position signal outputted from a position signal output section connected to the movable side multiplex device by multiplexing communication with the movable side multiplex device; an amplifier connecting section connected to a position signal output section amplifier, the amplifier being configured to transmit the position signal to the position signal output section amplifier; a measuring device connecting section connected to a position signal measuring device; and a switching section configured to switch from a connection between the multiplex connecting section and the position signal output section amplifier, and a connection between the multiplex connecting section and the position signal measuring device in accordance with detection of a connection between the measuring device connecting section and the position signal measuring device.

11 Claims, 11 Drawing Sheets

(51) Int. Cl.
  *H04L 12/46*    (2006.01)
  *H04L 49/60*    (2022.01)
  *H04L 69/08*    (2022.01)
  *H04N 7/12*     (2006.01)
  *H04N 7/18*     (2006.01)

(52) U.S. Cl.
  CPC ............ *H04L 12/46* (2013.01); *H04L 49/602* (2013.01); *H04L 69/08* (2013.01); *H04N 7/12* (2013.01); *H04N 7/18* (2013.01)

(56) References Cited

U.S. PATENT DOCUMENTS

| | | | |
|---|---|---|---|
| 2018/0014709 A1* | 1/2018 | O'Brien | A47L 9/2852 |
| 2019/0094981 A1* | 3/2019 | Bradski | G06F 3/017 |
| 2020/0070356 A1* | 3/2020 | Baptist | B25J 15/024 |
| 2022/0066456 A1* | 3/2022 | Ebrahimi Afrouzi | A47L 11/4011 |

* cited by examiner

FIG. 4

| | | | Clock counter | | | | | |
|---|---|---|---|---|---|---|---|---|
| Bit position | Stored data name | Error correction method | 0 | 1 | 2 | 3 | 4 | 5 | 6~9 |
| BIT0 ~ BIT23 | Camera related data | Reed-Solomon | Camera related data (CC1-CC4, UART, camera trigger, LED illumination on/off, etc.) | | | | | | |
| BIT24 | Linear scale | Hamming | E1D | E1 present | E1D | E1 present | Timeout | Error | FEC(15,11) |
| BIT25 | | | | | | | | | |
| BIT26 | | | | | | | | | |
| BIT27 | | | | | | | | | |
| BIT28 | Adjustment communication | | AD | AD present | AD | AD present | Timeout | Error | FEC(15,11) |
| BIT29 | DI signal | | DI1 | DI2 | DI3 | DI4 | Short circuit information | | FEC(15,11) |
| BIT30 | MIII | | MB0 | MB1 | MB2 | MB3 | MIII present | Error | FEC(15,11) |
| BIT31 | MIII | | MB0 | MB1 | MB2 | MB3 | MIII present | Error | FEC(15,11) |

Fixed section side → Movable section side

FRMD

FIG. 5

| Bit position | Stored data name | Error correction method | Clock counter | | | | | | |
|---|---|---|---|---|---|---|---|---|---|
| | | | 0 | 1 | 2 | 3 | 4 | 5 | 6~9 |
| BIT0 ~ BIT23 | Camera related data | Reed-Solomon | Camera related data (Image data, UART, etc.) | | | | | | |
| BIT24 | Linear scale | Hamming | E1D | E1 present | E1D | E1 present | Timeout | Error | FEC(15,11) |
| BIT25 | | | | | | | | | |
| BIT26 | | | | | | | | | |
| BIT27 | Adjustment communication | | AD | AD present | AD | AD present | Timeout | Error | FEC(15,11) |
| BIT28 | DI signal | | DI1 | DI2 | DI3 | DI4 | MIII present | Error | FEC(15,11) |
| BIT29 | | | | | | | | | |
| BIT30 | MIII | | MB0 | MB1 | MB2 | MB3 | MIII present | Error | FEC(15,11) |
| BIT31 | MIII | | MB0 | MB1 | MB2 | MB3 | MIII present | Error | FEC(15,11) |

Movable section side → Fixed section side

FRMD

FIG. 11

Synchronous communication

| | Communication method | Coding | Initial state | Normal state | Sampling period | Resolution |
|---|---|---|---|---|---|---|
| Case 1 | HDLC | Manchester | 2Mbps (500ns) | 2Mbps (500ns) | 16MHz (62.5ns) | Eight division |
| Case 2 | HDLC | Manchester | 2Mbps (500ns) | 2Mbps (500ns) | 32MHz (31.25ns) | Eight division |
| Case 3 | HDLC | Manchester | 2Mbps (500ns) | 4Mbps (250ns) | 32MHz (31.25ns) | Eight division |

MULTIPLEX DEVICE, ROBOT, AND METHOD FOR SWITCHING CONNECTION OF MULTIPLEX DEVICE

TECHNICAL FIELD

The present disclosure relates to a multiplex device for performing multiplexing communication with a position signal output section, a robot for performing multiplexing communication, and a method for switching connection of multiplex devices.

BACKGROUND ART

Conventionally, automation using robots has been promoted in the field of FA (Factory Automation) and the like. With these types of robots, a linear scale may be used to detect the position of a movable section such as a slider device (for example, refer to patent literature 1). The linear scale comprises, for example, a detected section and a linear head that moves over the detected section. The linear head outputs linear scale signals in response to changes in the position relative to the detected section. Examples of a detection method for the position include an optical detection method and a detection method using electromagnetic induction. The controller of the robot controls the operation of the movable section based on the linear scale signals.

CITATION LIST

Patent Literature

Patent literature 1: JP-A-2016-151851

BRIEF SUMMARY

Technical Problem

In addition to a linear scale, various devices such as a sensor and a camera may be mounted on the movable section of the robot. In this case, various data are transmitted between a fixed section in which the controller is arranged and the movable section on which the linear scale and the like are arranged. Therefore, if the fixed section and the movable section are connected by multiplex communication, wiring can be saved. In addition, the reduction of communication cables and the miniaturization of cable ducts can be achieved by the reduction of wiring, and the miniaturization of the movable section can be achieved.

On the other hand, linear scales require adjustments of the sensing sensitivities when, for example, errors occur in manufacturing sites using robots. For example, a user connects an adjustment computer to the linear scale, and adjusts the amplification factor of the amplifier for amplifying the linear scale signal. However, the connection between the linear scale and the adjustment computer may become difficult due to various factors such as the miniaturization of the movable section described above.

The present disclosure takes account of the above problems, and an object thereof is to provide, for a multiplex device for transmitting a position signal by multiplex communication, a multiplex device capable of adjusting a position signal output section, a robot, and a method for switching connection of the multiplex device.

Solution to Problem

To solve the above problems, disclosed herein is a multiplex device including: a multiplex connecting section connected to a movable side multiplex device, the multiplex connecting section being configured to transmit a position signal outputted from a position signal output section connected to the movable side multiplex device by multiplexing communication with the movable side multiplex device; an amplifier connecting section connected to a position signal output section amplifier, the amplifier connecting section being configured to transmit the position signal to the position signal output section amplifier; a measuring device connecting section connected to a position signal measuring device; and a switching section configured to switch from a connection between the multiplex connecting section and the position signal output section amplifier, and a connection between the multiplex connecting section and the position signal measuring device in accordance with detection of a connection between the measuring device connecting section and the position signal measuring device.

Further, to solve the above problems, disclosed herein is a robot including: a movable section; a position output section provided on the movable section and configured to output a position signal representing a position of the movable section; a movable side multiple device provided on the movable section; a communication cable connected to the movable side multiple device; a multiplex connecting section connected to the communication cable and configured to transmit the position signal outputted from the position signal output section via multiplex communication with the movable side multiplex device; an amplifier connecting section connected to the multiplex connecting device; a position signal output section amplifier connected to the amplifier connection section; a measuring device connecting section connected to the position signal measuring device; and a switching section configured to switch from a connection between the multiplex connecting section and the position signal output section amplifier, and a connection between the multiplex connecting section and the position signal measuring device in accordance with detection of a connection between the position signal measuring device and the measuring device connecting section.

Further, to solve the above problems, disclosed herein is a method of switching a connection of a multiplex device including a multiplex connecting section connected to a movable side multiple device and configured to transmit a position signal outputted from a position signal output section connected to the movable side multiplex device by multiplexing communication with the movable side multiplex device, an amplifier connecting section connected to a position signal output section amplifier and configured to transmit the position signal to and from the position signal output section amplifier, and a measuring device connecting section connected to a position signal measuring device, the method including: detecting whether the measuring device connecting section and the position signal measuring device are connected to each other; and switching from a connection between the multiplex connecting section and the position signal output section amplifier, and a connection between the multiplex connecting section and the position signal measuring device in accordance with detection of a connection between the position signal measuring device and the measuring device connecting section.

Advantageous Effects

According to a multiplex device and the like of the present disclosure, it is possible to connect a position signal output section and a position signal measuring device via multiplex communication and to perform adjustment processing with respect to the position signal output section even in a case in which a direct connection between the position signal output section and the position signal measuring device is difficult due to a movable section being small or the like.

BRIEF DESCRIPTION OF DRAWINGS

FIG. 4 shows content of frame data transmitted from a fixed section side to a movable section side.

FIG. 5 shows content of frame data transmitted from a movable section side to a fixed section side.

FIG. 11 shows a sampling cycle and the like in a case in which communication of a linear scale signal is performed by a synchronous communication method.

DESCRIPTION OF EMBODIMENTS

Embodiments of the present disclosure will be described below with reference to the drawings. First, an electronic component mounting device (hereinafter, sometimes referred to as "mounting device") will be described as an example of a device to which the multiplex device of the present disclosure is applied.

Configuration of Mounting Device 10

Figure 1:
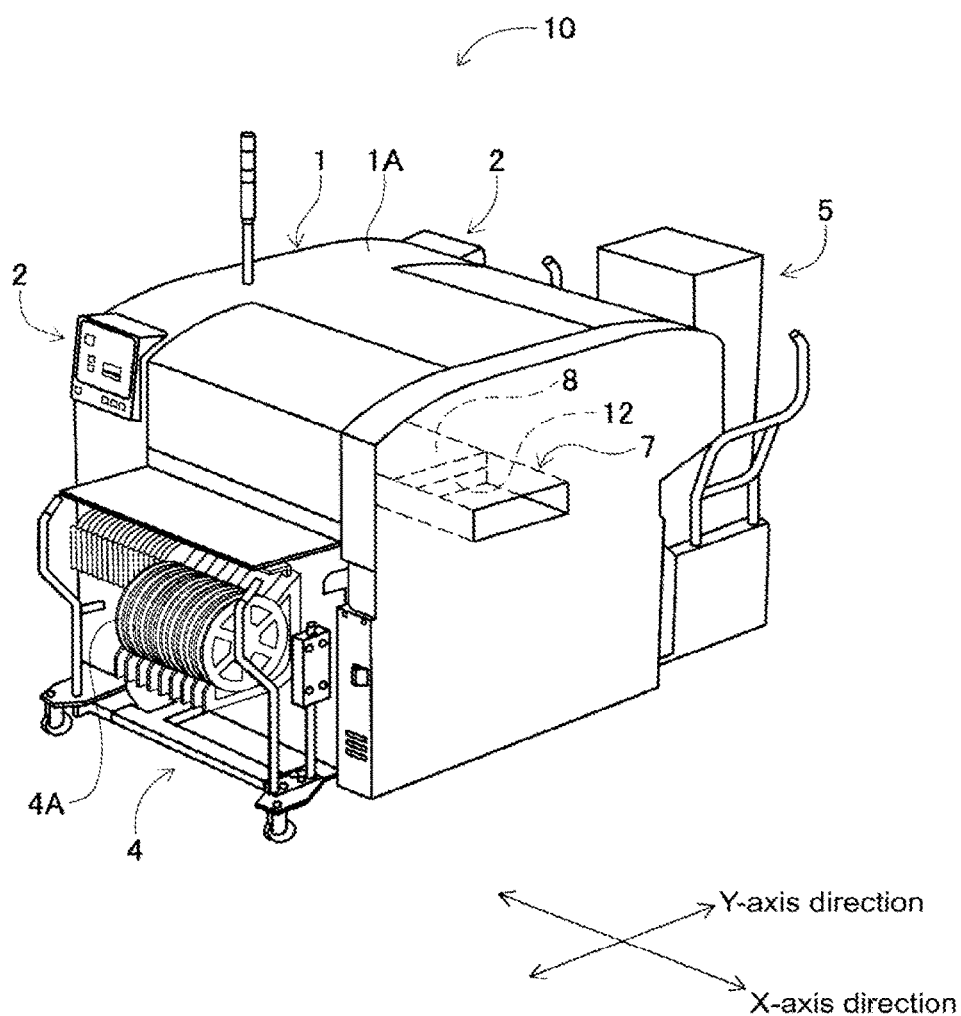
FIG. 1 is a perspective view of an electronic component mounting device of an embodiment.

As shown in FIG. 1, mounting device 10 is provided with device main body 1, pair of display devices 2 provided integrally with device main body 1, and supply devices 4 and 5 removably provided on device main body 1. Mounting device 10 of the present embodiment performs mounting work of mounting electronic components (not shown) onto circuit board 8 conveyed by conveyance device 7 housed inside device main body 1 based on control performed by controller 13 shown in FIG. 3. Note that, in the present embodiment, as shown in FIGS. 1 and 2, the direction in which circuit board 8 is conveyed (left-right direction in FIG. 2) is referred to as the X-axis direction, and the direction perpendicular to the X-axis direction horizontally to the conveyance direction of circuit board 8 is referred to as the Y-axis direction.

Device main body 1 is provided with display devices 2 at both sides in the Y-direction at one end of device main body 1 in the X-axis direction. Each display device 2 is a display device of the touchscreen panel type, and displays information about the mounting work of the electronic components. Supply devices 4 and 5 are mounted on device main body 1 sandwiching it from both sides in the Y-axis direction. Supply device 4 is a feeder type supply device, and has multiple tape feeders 4A in which various types of electronic components are taped and housed in a state wound around a reel. Supply device 5 is a tray type supply device and has multiple component trays 5A (refer to FIG. 2) on which multiple electronic components are loaded.

Figure 2:
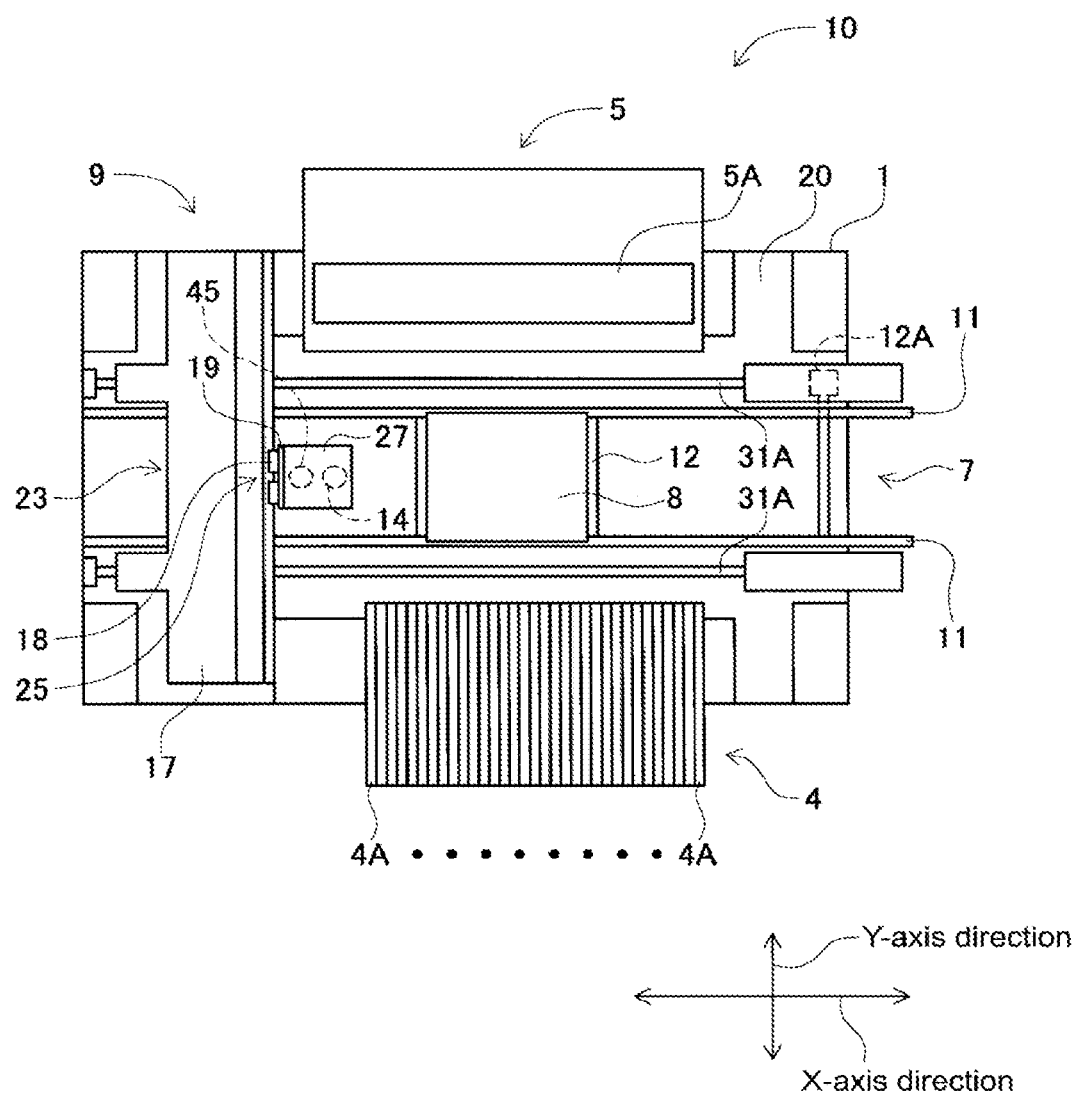
FIG. 2 is a schematic plan view of the electronic component mounting device shown in FIG. 1 with the upper cover removed.

FIG. 2 is a schematic plan view of mounting device 10 from above (upper side in FIG. 1) with upper cover 1A (see FIG. 1) of device main body 1 removed. As shown in FIG. 2, device main body 1 includes, on base 20, the above-mentioned conveyance device 7, head section 27 for mounting an electronic component on circuit board 8, and moving device 9 for moving head section 27. Base 20 is fixedly provided at a location where mounting device 10 is installed, and is provided with controller 13 (refer to FIG. 3).

Conveyance device 7 is provided at a substantially central section of base 20 in the Y-axis direction, and includes pair of guide rails 11, board holding device 12 held by guide rails 11, and electromagnetic motor 12A for moving board holding device 12. Board holding device 12 holds circuit board 8. The output shaft of electromagnetic motor 12A is connected to a conveyor belt that is provided on the side of guide rail 11. Electromagnetic motor 12A is, for example, a servo motor capable of accurately controlling a rotational angle. Conveyance device 7 moves circuit board 8 in the X-axis direction together with board holding device 12 by the conveyor belt being revolved based on the driving of electromagnetic motor 12A.

Head section 27 has suction nozzle 14 that picks up an electronic component on a lower surface of the suction nozzle 14 that faces circuit board 8. Suction nozzle 14 is connected to a negative pressure air and positive pressure air passage via a solenoid valve (not shown) of a positive and negative pressure supply device (not shown), and picks up and holds an electronic component using negative pressure, and releases the held electronic component by being supplied with a slight positive pressure. Head section 27 includes multiple electromagnetic motors 37 (see FIG. 3) as a drive source for raising and lowering suction nozzle 14 and rotating suction nozzle 14 about its axial center so as to change the vertical position of the held electronic component and the pickup orientation of the held electronic component. Further, multiple suction nozzles 14 are provided. Head section 27 has a built-in electromagnetic motor 37 for individually rotating suction nozzle 14. Further, head section 27 is provided with slave 41 (see FIG. 3) connected to a control network, which is described later. Also, head section 27 is provided with component camera 45 for capturing an image of the electronic component picked up and held by suction nozzle 14 from a supply position of supply devices 4 and 5. Image data captured by component camera 45 is processed by controller 13 (refer to FIG. 3) and an error or the like in the holding position of the electronic component on suction nozzle 14 is acquired. Note that, suction nozzle 14 is removable with respect to head section 27 and may be changed in accordance with the size, shape, and the like of the electronic component.

Head section 27 is moved to any position on base 20 by moving device 9. More specifically, moving device 9 includes: X-axis slide mechanism 23 for moving head section 27 in the X-axis direction; and Y-axis slide mechanism 25 for moving head section 27 in the Y-axis direction. X-axis slide mechanism 23 has X-axis slider 17 mounted on base 20 so as to be movable in the X-axis direction, and linear motor 31 (refer to FIG. 3) as a drive source. X-axis slider 17 moves to any position along the X-axis direction based on the driving of linear motor 31. Linear motor 31 is provided with, for example, permanent magnets for which the N and S poles are alternately arranged on the inner wall of guide rail 31A arranged on base 20 as the fixed section side, and an excitation coil is provided on X-axis slider 17 as the movable section side. X-axis slider 17 generates a magnetic field by supplying electric power to excitation coil, and moves by the action of the magnetic field generated from the permanent magnets of guide rail 31A on the fixed section side. The above-described configuration of linear motor 31 is only an example of a configuration, and may be modified as appropriate.

Figure 3:
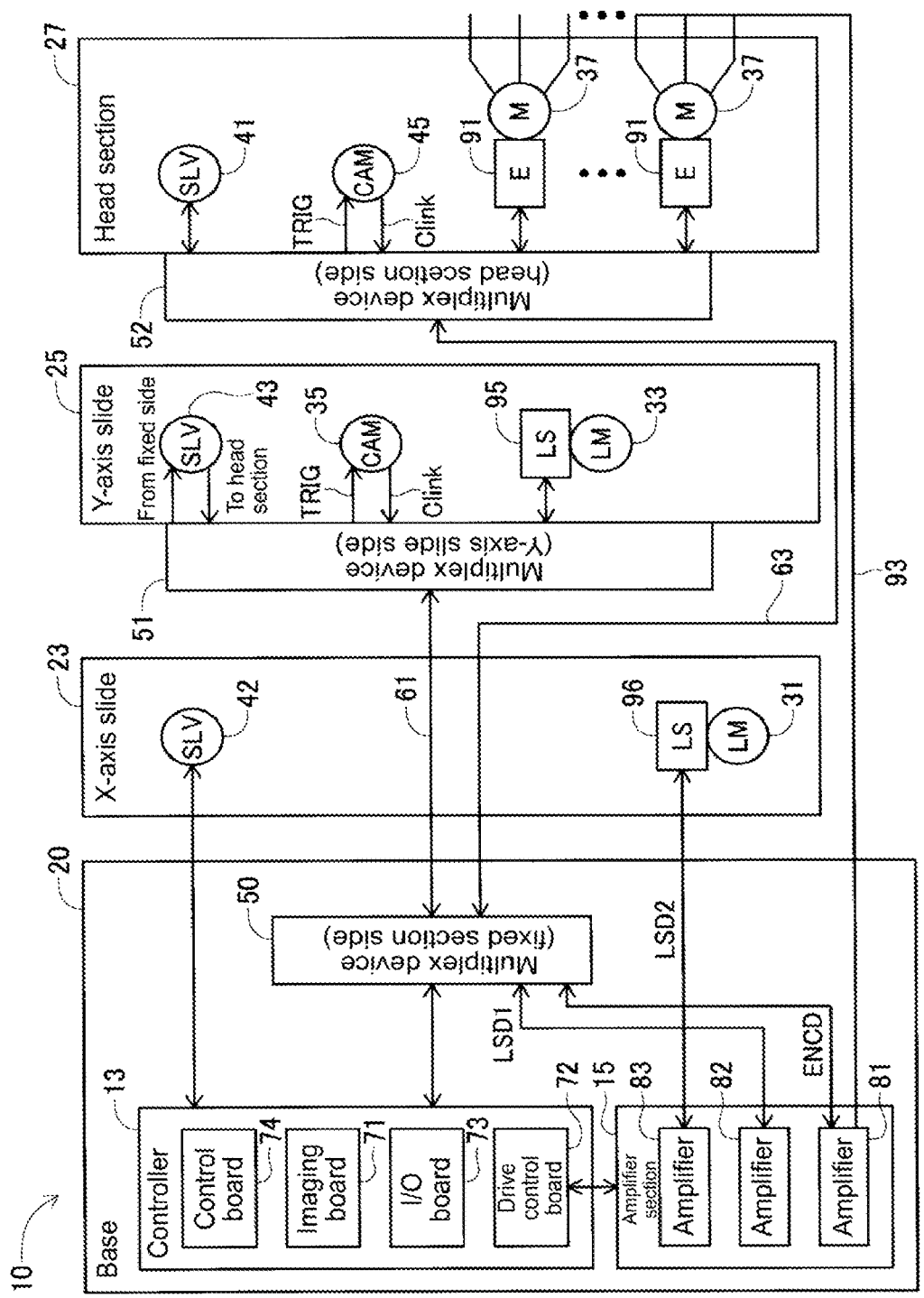
FIG. 3 is a block diagram showing a configuration of the electronic component mounting device of the embodiment.

Y-axis slide mechanism 25 includes Y-axis slider 18 provided on a side surface of X-axis slider 17 so as to be movable in the Y-axis direction, and linear motor 33 as a drive source (see FIG. 3). Y-axis slider 18 moves to any position along the Y-axis direction based on the driving of linear motor 33. Further, mark camera 35 (see FIG. 3) for imaging circuit board 8 is fixed to Y-axis slider 18 so as to face downward. Thus, mark camera 35 can image the surface of circuit board 8 at any position by Y-axis slider 18 being moved. The image data captured by mark camera 35 is processed by controller 13 (see FIG. 3), and information of circuit board 8, error of mounting positions, and the like are acquired. Further, head section 27 is attached to Y-axis slider 18 and is moved to any position on base 20 as moving device 9 is driven. Also, head section 27 is detachably attached to Y-axis slider 18 via connector 19 and can be changed to a different type of head section, for example, a dispenser head or the like.

Configuration of Multiplex Communication

Next, the configuration of multiplex communication of mounting device 10 will be described. FIG. 3 is a block diagram showing the configuration of mounting device 10. As shown in FIG. 3, base 20 is provided with controller 13 and amplifier section 15. Mounting device 10 performs data transmission between fixed base 20 and the devices provided in the movable sections (Y-axis slide mechanism 25 and head mechanism 27) that move relative to base 20 by multiplex communication. Also, each device (for example, linear scale 96) provided on X-axis slide mechanism 23 is connected to a device (for example, amplifier section 15) on the base 20 side not via multiplex communication. Note that, the configuration of multiplex communication of FIG. 3 is an example configuration and may be changed appropriately in accordance with the configuration of the like of mounting device 10.

Multiplex device 50 is provided inside base 20. Multiplex device 50 is connected to multiplex device 51 provided on Y-axis slide mechanism 25 via communication cable 61. Communication cable 61 is, for example, a fiber optic cable. Multiplex device 50 multiplexes various data by, for example, a time division multiplexing method (TDM: Time Division Multiplexing), and transmits and receives multiplexed frame data (see frame data FRMD of FIGS. 4 and 5) via communication cable 61. The communication line of communication cable 61 is, for example, 5 Gbps full duplex communication.

Controller 13 mainly includes a computer including a CPU, RAM, and the like, and includes imaging board 71, drive control board 72, I/O board 73, and control board 74. Imaging board 71 is a board for controlling the transmission and reception of data, such as image data, between mark camera 35 of Y-axis slide mechanism 25 and component camera 45 of head section 27. Mark camera 35 outputs captured image data via camera link cable Clink to multiplex device 51 in accordance with, for example, the camera link image transmission standard. Mark camera 35 captures images in response to trigger signal TRIG from, for example, I/O board 73, and outputs the captured image data to multiplex device 51 via camera link cable Clink. Imaging board 71 receives image data transmitted from mark camera 35 to multiplex device 50 via communication cable 61. Note that, mark camera 35 is not limited to a camera corresponding to the camera link standard, and may be a camera corresponding to another standard, for example, the GigE Vision (registered trademark) standard or the CoaXpress (registered trademark) standard.

Also, multiplex device 50 provided on base 20 is connected to multiplex device 52 provided on head section 27 via communication cable 63. Communication cable 63 is, for example, a fiber optic cable. Component camera 45 of head section 27 captures an image in response to trigger signal TRIG from I/O board 73, and outputs the captured image data to multiplex device 52 via camera link cable Clink. Imaging board 71 receives image data of component camera 45 via communication cable 63.

Drive control board 72 controls amplifier section 15 to control electromagnetic motor 37 of head section 27, linear motor 31 of X-axis slide mechanism 23, and linear motor 33 of Y-axis slide mechanism 25. Drive control board 72 is connected to amplifier section 15. Drive control board 72 and amplifier section 15 are connected by, for example, an industrial Ethernet (®, for example, 100base-tx communication) such as MECHATROLINK (®)-III or EtherCAT(®). Alternatively, drive control board 72 and amplifier section 15 are connected by an industrial network (RS-485 communication or the like) such as MECHATROLINK (®)-II or CC-Link (®). Amplifier section 15 includes amplifiers 81, 82, and 83 corresponding to head section 27, X-axis slide mechanism 23, and Y-axis slide mechanism 25, respectively. Amplifier 81 corresponds to head section 27. Head section 27 is provided with multiple encoders 91 corresponding to the multiple electromagnetic motors 37. Amplifier 81 transmits encoder signal ENCD representing a checking command of an activation status or the like to encoder 91 via communication cable 63. Further, amplifier 81 also receives encoder signal ENCD such as position information from encoder 91 via communication cable 63. Amplifier 81 transfers received encoder signal ENCD to drive controller 72. Drive control board 72 controls amplifier 81 based on inputted encoder signal ENCD, and performs feedback-control on the operation of electromagnet motor 37. Electromagnetic motor 37 is, for example, a servo motor driven by a three-phase alternating current having coils of respective phases of a U-phase, a V-phase, and a W-phase, and the coils of the respective phases are connected to amplifier 81 via power supply line 93. Electromagnetic motor 37 is driven in accordance with three-phase alternating current supplied from amplifier 81 via power supply line 93. For example, drive control board 72 performs feedback control such as PID control based on the received encoder signal ENCD, and changes the duty ratio of the power supply voltage supplied from amplifier 81 to electromagnetic motor 37. As a result, the position and the like of suction nozzle 14 of head section 27 are changed.

Further, Y-axis slide 25 is also provided with linear scale 95 that detects the position of Y-axis slider 18 (see FIG. 2) that moves on the guide rail in the Y-axis direction. Linear scale 95 includes, for example, a detected section and a linear head. The detected section is provided on the guide rail and is arranged along the Y-axis direction. The linear head is provided on Y-axis slider 18 and is arranged such that there is a predetermined gap between the linear head and the detected section. Linear scale 95 outputs linear scale signal LSD1 corresponding to the moving position (Y-coordinate position) of Y-axis slider 18 in accordance with the movement of Y-axis slider 18, that is, the movement of the linear head. Note that, a detection method of the position by the linear head, for example, an optical detection method or a detection method using electromagnetic induction may be used. Linear scale 95 transmits linear scale signal LSD1 to amplifier 82 via communication cable 61. Amplifier 82 controls linear motor 33 based on the linear scale signal LSD1 received from linear scale 95.

More specifically, linear motor 33 is provided with permanent magnets arranged on the guide rail and an excitation coil provided on Y-axis slider 18, similar to linear motor 31 described above. Drive control board 72 determines the control contents such as the rotational position of linear motor 33 (Y-axis position of Y-axis slider 18) based on linear scale signal LSD1 of linear scale 95, and notifies amplifier 82 of the determined control contents. Amplifier 82 is connected to, for example, an excitation coil of linear motor 33 provided on Y-axis slider 18 by a power supply line (not shown), and is capable of controlling power supplied to the excitation coil. Amplifier 82 controls the power supplied to the excitation coils based on the control contents received from drive control board 72, thereby controlling the position, speed, and the like of Y-axis slider 18.

Similarly, X-axis slide mechanism 23 is provided with linear scale 96 for detecting the position of X-axis slider 17 that moves on guide rail 31A (refer to FIG. 2) in the X-axis direction. Linear scale 96 is directly connected to amplifier 83 without going via communication cables 61 or 63, and outputs linear scale signal LSD2 such as the X-axis position (X-coordinate value) of X-axis slider 17 to amplifier 83. Amplifier 83 controls linear motor 31, that is, controls the position and speed of X-axis slider 17, based on linear scale signal LSD2 received from linear scale 96. Note that, linear scale signals LSD1 and LSD2 and encoder signal ENCD described above are concepts including, for example, both position information transmitted from linear scales 95 and 96 and encoder 91 to amplifier section 15, and control commands transmitted from amplifier section 15 to linear scale 95 and the like (such as initial setting information and inquiry information for acquiring a rotational position).

I/O board 73 is a board for processing control signals of component camera 45 and mark camera 35, detection signals of various sensors, and the like. For example, controller 13 controls I/O board 73 to transmit trigger signal TRIG to component camera 45.

Control board 74 is a board for controlling slave 41 of head section 27, slave 42 of X-axis slide mechanism 23, and slave 43 of Y-axis slide mechanism 25 via an industrial network. Control board 74 is connected to slaves 41, 42, and 43 via communication cables 61 and 63 and a local network. Slave 41, for example, is connected to an element such as a sensor of head section 27, and processes signals input to and output from the element. Similarly, the other slaves 42 and 43 process signals input to and output from various elements of X-axis slide mechanism 23 and Y-axis slide mechanism 25. An industrial network is, for example, MECHATRO-LINK(®)-III, or EtherCAT(®). For example, in the industrial network, control board 74 is set as a master, and a field network for transmitting and receiving control data for controlling elements connected to slaves 41, 42, and 43 is constructed between control board 74 and slaves 41, 42, and 43. As a result, it is possible to realize a reduction in the number of wires and the like, thereby reducing costs for constructing the network. For example, control data transmitted from master control board 74 is transmitted so as to circulate through each of the slaves 41, 42, and 43, such that master control board 74 controls various elements (relays, switches, sensors, display lamps, and the like).

Multiplex devices 50, 51, and 53 multiplex the data of the respective devices (such as mark camera 35) provided on head section 27 and Y-axis slide mechanism 25, and transmit the multiplexed data via communication cable 61 and communication cable 63. For example, multiplex device 50 demultiplexes the frame data received from multiplex device 51, and transmits the individual data to a corresponding board such as imaging board 71. Controller 13 processes the data outputted from multiplex device 50 to the boards, and performs subsequent control on head section 27 and the like. Further, mounting device 10 performs electronic component mounting operation on circuit board 8 while transmitting the data relating to the mounting operation between the respective devices by multiplex communication.

Configuration of Frame Data FRMD

FIGS. 4 and 5 show the contents of frame data FRMD transmitted via communication cable 61. FIG. 4 shows an example of frame data FRMD transmitted from multiplex device 50 (on the fixed section side) to multiplex device 51 (on the movable section side). FIG. 5 shows an example of frame data FRMD transmitted from multiplex device 51 to multiplex device 50. FIGS. 4 and 5 each show 32-bit frame data FRMD. For example, frame data FRMD is 8B/10B converted every 8 bits in order to maintain the DC-balance of the transmission data, and totals 40 bits. Accordingly, frame data FRMD is configured such that, for example, one frame is 40 bits. For example, when the cycle per frame is set to 8 nsec (the frequency is 125 MHz), multiplex devices 50 and 51 configure a communication line of 5 Gbps (40 bits×125 MHz).

FIGS. 4 and 5 show data of frame data FRMD by single clock (for example, 8 nsec). Further, FIGS. 4 and 5 show data for ten clocks, 0 to 9. As shown in FIGS. 4 and 5, camera-related data is set in the leading bit of BIT0 to BIT23 of the frame data FRMD. As a method of error correction, for example, Reed-Solomon code can be used. In the data transmitted from multiplex device 50 shown in FIG. 4, a control signals for controlling mark camera 35 and the like are set. Here, control signal refers to, for example, control signal CC1 to CC4 in the case of the camera link standard. Alternatively, the control signal is a control signal for UART communication, a trigger signal TRIG, or the like. Further, the control signal is a control signal for switching on/off light of LEDs and the like included in mark camera 35. Also, in the data transmitted from multiplex device 51 shown in FIG. 5, image data captured by mark camera 35, control signals by UART communication, and the like are set as camera-related data.

Data of linear scale 95 of Y-axis slide mechanism 25 is set in BIT24. Also, as an error correction method for BIT24 to BIT31 data, for example, a Hamming code can be used. In BIT24, data relating to linear scale signal LSD1 is set to the first four clocks (clocks 0 to 4 in FIGS. 4 and 5) out of the ten clocks (E1 in FIGS. 4 and 5). Linear scale signal LSD1 is bit-allocated to the respective bit positions of clocks 0 and 2. Further, the bit positions of clocks 1 and 3 are assigned with information indicating the presence or absence of data of linear scale signal LSD1 ("E1D present" in FIGS. 4 and 5). Information indicating the presence or absence of data is, for example, information for indicating whether the low-speed linear scale signal LSD1 is set to the respective bit positions (clocks 0 and 1 of BIT24) when the data transfer rate of linear scale signal LSD1 is lower than the data transfer rate of frame data FRMD. Linear scale signal LSD1 and the data indicating the presence or absence of linear scale signal LSD1 are alternately set for each cycle. Similarly, in BIT25 to BIT31 described later, information indicating the presence or absence of data is set (such as "AD present" in FIGS. 4 and 5).

Further, BIT24 clock 4 is set with timeout information indicating whether a timeout error has occurred in communication with linear scale 95. In addition, information indicating whether an error has occurred in amplifier section 15 (on the fixed section side) or linear scale 95 (on the movable section side) ("error" in FIGS. 4 and 5) is set in BIT24 clock 5. Here, an error refers to the occurrence of an error in the data, an error in the operation state, or the like. 4-bit code bits that are Hamming codes of forward error correction code are set in BIT24 clocks 6 to 9. An error correction code is, for example, a shortened form of Hamming code (15, 11). When receiving frame data FRMD, multiplex devices 50 and 51 perform error detection and correction based on the error correction code on the data of linear scale signal LSD1 that has been demultiplexed.

Specifically, for example, multiplex device 50 includes decoding processing section 114 (see FIG. 6), which will be described later. Decoding processing section 114 demultiplexes frame data FRMD received from, for example, multiplex device 51 and separates linear scale signal LSD1 from frame data FRMD. Decoding processing section 114 synthesizes linear scale signal LSD1 from data divided into multiple pieces of frame data FRMD, for example. Decoding processing section 114 performs error detection according to the forward error correction code (FEC) of the Hamming code on the synthesized linear scale signal LSD1, and performs data correction according to the error detection. Decoding processing section 114 outputs the corrected linear scale signal LSD1 to amplifier section 15. Note that, in BIT28 to BIT31 to be described later, similar to BIT24, the timeout information ("timeout" in FIGS. 4 and 5), the error occurrence information ("error" in FIGS. 4 and 5), and the error correction code ("FEC (15, 11)" in FIGS. 4 and 5) are set. The bit positions of BIT25 to BIT27 are empty bits. For example, when the number of linear scales 95 to be attached to Y-axis slide mechanisms 25 is increased, the linear scale signals LSD1 of the linear scales 95 may be allocated to the empty bits. In the following description, the same content as the description of BIT24 described above is omitted as appropriate.

In BIT28, adjustment data used for adjustment of linear scale 95 to be described later is set ("AD" in FIGS. 4 and 5 and so on). For example, in the adjustment process described later, with respect to linear scale 95 connected to multiple device 51, linear scale signal LSD1 is acquired (position is measured), the state is acquired, the set value is acquired, and the set value is changed from adjustment computer 121 (see FIG. 7) connected to multiplex device 50. The acquisition of the state is, for example, a process of inquiring whether an error has occurred. Further, acquiring or changing the set value is, for example, acquisition or changing processing of an amplification factor of linear scale signal LSD1 (such as the gain of the amplifier). With the communication from the fixed section side shown in FIG. 4, commands for acquiring the set value and the like are set in BIT28. Further, with the communication from the movable section side shown in FIG. 5, data for responding to the set value and the like are set in BIT28. Also, above-mentioned timeout information and the like are set in clocks 4 to 9 of BIT28. Note that, adjustment data AD may have the same data type as that of linear scale signal LSD1, or may have a data format different from that of linear scale signal LSD1. Further, for example, when adjustment data AD and linear scale signal LSD1 are data of the same format, the bit positions for transmitting adjustment data AD and linear scale signal LSD1 in frame data FRMD may be shared. That is, the same bit value may be used for communication of linear scale 95 in the normal operation state and the adjustment state.

Also, data related to a digital input/output signal (DI signal) is set in DI1 to DI4 of clocks 0 to 4 of BIT29. The DI signal is used as a signal for driving various relays, sensors, and the like.

Further, as shown in FIG. 4, clock 4 of BIT29 is set with short circuit information for notifying that adjustment computer, which is described later, is connected. Multiplex device 51 on the movable section side receives the short circuit information from multiplex device 50 on the fixed section side, and determines whether to perform normal operation communication or adjustment communication for adjusting linear scale 95. With mounting device 10 of the present embodiment, since adjustment computer 121 is connected to the fixed section side multiplex device 50, multiplex device 50 notifies multiplex device 51 of the short circuit information. Therefore, as shown in FIG. 5, with the communication from the movable section side, clock 4 of BIT29 is an empty bit. Note that, clock 5 of BIT29 is also an empty bit.

Further, data related to an industrial network, for example, data related to MECHATROLINK (®)-III is set in BIT30 and BIT31 (such as "MB0 to MB3" in FIGS. 4 and 5). Control data of MECHATROLINK (®)-III is set in the four bits of clocks 0 to 3 of BIT30 and BIT31. Information indicating the existence of data is set in clock 4 of BIT30 and BIT31. The configuration of frame data FRMD shown in FIGS. 4 and 5 is merely an example, and the configuration may be appropriately changed according to the required communication rate, the type and number of devices attached to mounting device 10, and the like.

Adjustment of Linear Scale 95

Next, adjustment operation of linear scale 95 will be described. With linear scale 95, it is required to adjust the detection sensitivity when, for example, position detection errors occur in a manufacturing plant that manufactures mounting device 10 or at a manufacturing site that uses mounting device 10. For example, a production site user may adjust the distance between the linear head of linear scale 95 and the detected section. Further, for example, a production site user may connect adjustment computer 121 (refer to FIG. 7) to linear scale 95 and acquire linear scale signal LSD1 of linear scale 95, or adjust the amplification factor of the amplifier of linear scale 95.

Figure 6:
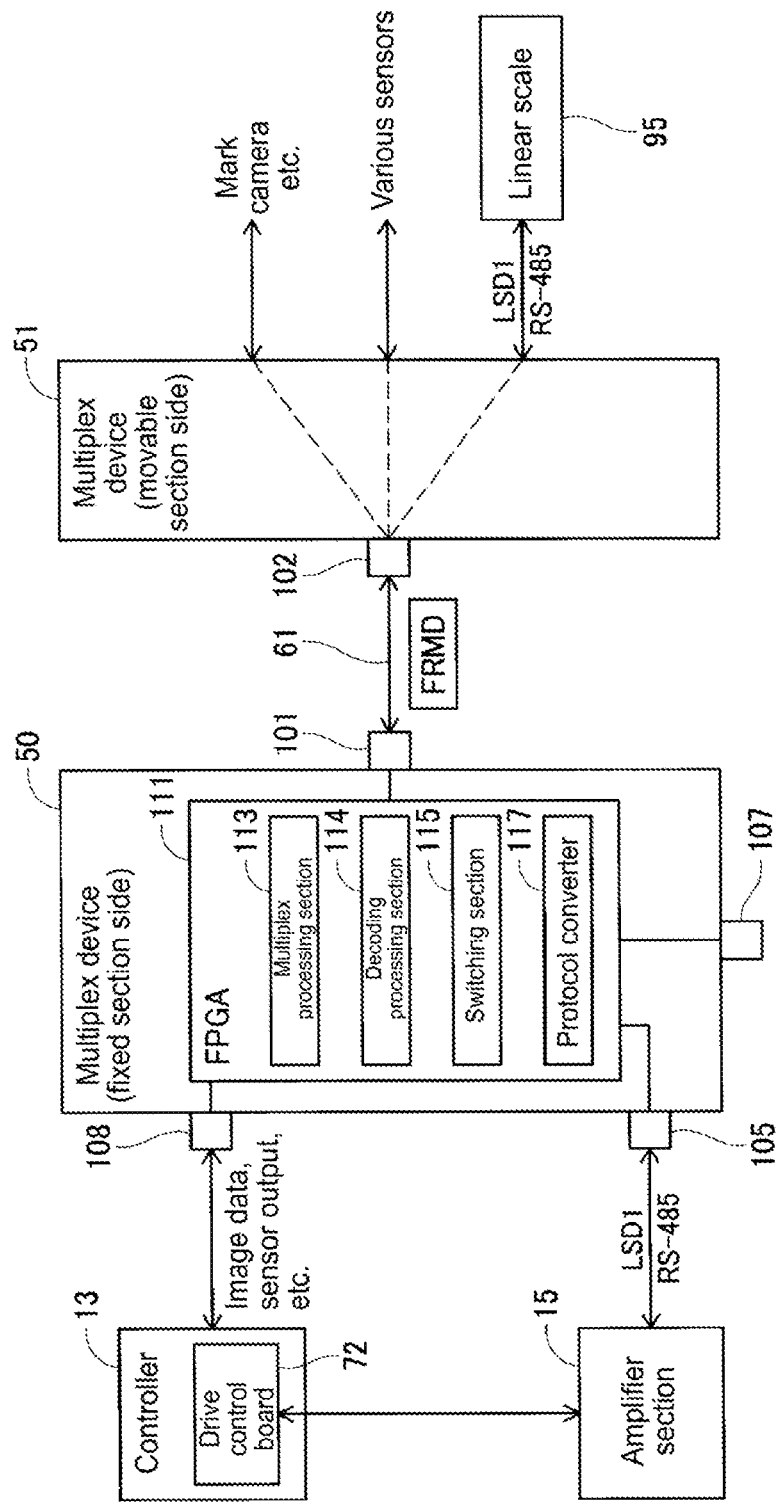
FIG. 6 is a block diagram illustrating a connection state of the mounting device.

FIG. 6 shows the connection state of the above mounting device 10. Note that, FIG. 6 mainly shows a section required for illustrating the adjustment operation of linear scale 95, other sections (head section 27, multiplex device 52, and the like) are omitted. As described above, multiplex devices 50 and 51 transmit and receive frame data FRMD obtained by multiplexing image data, linear scale signal LSD1, and the like. Multiplex device 50 is provided with multiplexing connecting section 101 connected to communication cable 61. Similarly, multiplex device 51 is provided with multiplexing connecting section 101 connected to communication cable 61. Multiplexing connecting sections 101 and 102 are, for example, optical modules connected to an optical fiber cable, and are interfaces for converting electrical signals into optical signals.

Multiplex device 50 is connected to amplifier section 15 by, for example, serial communication based on RS-485, and transmits and receives linear scale signal LSD1. Multiplex device 50 includes amplifier connecting section 105 connected to amplifier section 15, and transmits and receives linear scale signal LSD1 via amplifier connecting section 105. Amplifier connecting section 105 is, for example, an interface conforming to the RS-485 standard.

Multiplex device 50 includes adjustment connector 107 (an example of a measuring device connecting section) which is an interface for connecting to adjustment computer 121. Adjustment computer 121 of the present embodiment (an example of a position signal measuring device) performs, for example, communication with linear scale and adjustment of linear scale 9 using a general-purpose interface provided in a personal computer such as RS-232C. Therefore, adjustment connector 107 is, for example, an interface conforming to the RS-232C standard. Multiplex device 50 inputs and outputs commands and set values (adjustment data AD in FIGS. 4 and 5) transmitted and received between adjustment computer 121 and linear scale 95 via adjustment connector 107.

Also, multiplex device 50 includes controller connecting section 108 (an example of a master connecting section) connected to controller 13. Multiplex device 50 inputs and outputs the above-described camera related data and digital input/output signals (see FIGS. 4 and 5) via controller connecting section 108. Further, control board 74 of controller 13 inputs and outputs control data transmitted and received between slaves via controller connecting section 108.

Further, multiplex device 50 of the present embodiment is provided with FPGA (Field Programmable Gate Array) 111 as a data processing circuit. FPGA 111 is provided with multiplex processing section 113, decoding processing section 114, switching section 115, and protocol converter 117. Multiplex processing section 113, decoding processing section 114, switching section 115, and protocol converter 117 are, for example, circuit blocks of FPGA 111, and a circuit is constructed based on configuration data. The processing circuit included in multiplex device 50 is not limited to an FPGA, and may be another programmable logic device such as a CPLD. The method of realizing the processing by the processing circuit is not limited to a programmable logic device, and may be realized by executing a program on a CPU.

Multiplex processing section 113 and decoding processing section 114 perform processes related to multiplex communication. Multiplex processing section 113 performs, for example, a process of multiplexing various data to generate frame data FRMD. Decoding processing section 114 separates the received frame data FRMD and extracts various data. Also, decoding processing section 114 performs addition processing of an error correction code, error correction processing, and the like.

Switching section 115 switches the connections of multiplex connecting section 101, amplifier connecting section 105, and adjustment connector 107. Switching section 115 connects multiplex connecting section 101 and amplifier connecting section 105 in an operating state in which linear scale 95 and amplifier section 15 are connected, that is, in a state in which an electronic component is mounted on circuit board 8 (see FIG. 1). Switching section 115 is set to connect multiplex connecting section 101 and amplifier connecting section 105, for example, with initialization values at the time of startup. Switching section 115 automatically performs switching of connecting multiplex connecting section 101 to adjustment connector 107 when the adjustment is performed to connect linear scale 95 and adjustment computer 121, that is, when adjustment operation of linear scale 95 is performed.

Protocol converter 117 converts communication of RS-485 (an example of a first protocol) and communication of RS-232C (an example of a second protocol). As described above, linear scale 95 of the present embodiment performs communication by RS-485. On the other hand, adjustment computer 121 performs communication by RS-232C. In the adjustment state, protocol converter 117 performs protocol conversion for communication between adjustment computer 121 and linear scale 95. Protocol converter 117 converts a command transmitted from adjustment computer 121 to linear scale 95, data responding from linear scale 95 to adjustment computer 121, and the like into a data format according to the protocol.

Accordingly, multiplex device 50 of the present embodiment includes protocol converter 117 that converts RS-485 (an example of the first protocol) and RS-232C (an example of the second protocol). Protocol converter 117 converts communication by the second protocol between adjustment computer 121 and adjustment connector 107 into communication by the first protocol between linear scale 95 and multiplex connecting section 101 in response to the connection between multiplex connecting section 101 and adjustment connector 107 (adjustment computer 121) by switching section 115.

According to this, by performing the conversion of the communication protocol in multiplex device 50, it becomes unnecessary to provide a protocol conversion device or the like between multiplex device 50 and adjustment computer 121. Further, for example, when an IC or the like having a protocol conversion function is loaded in advance in multiplex device 50, the protocol converter need not be separately prepared by using the IC or the like as protocol converter 117, and the manufacturing cost can be reduced.

Figure 7:
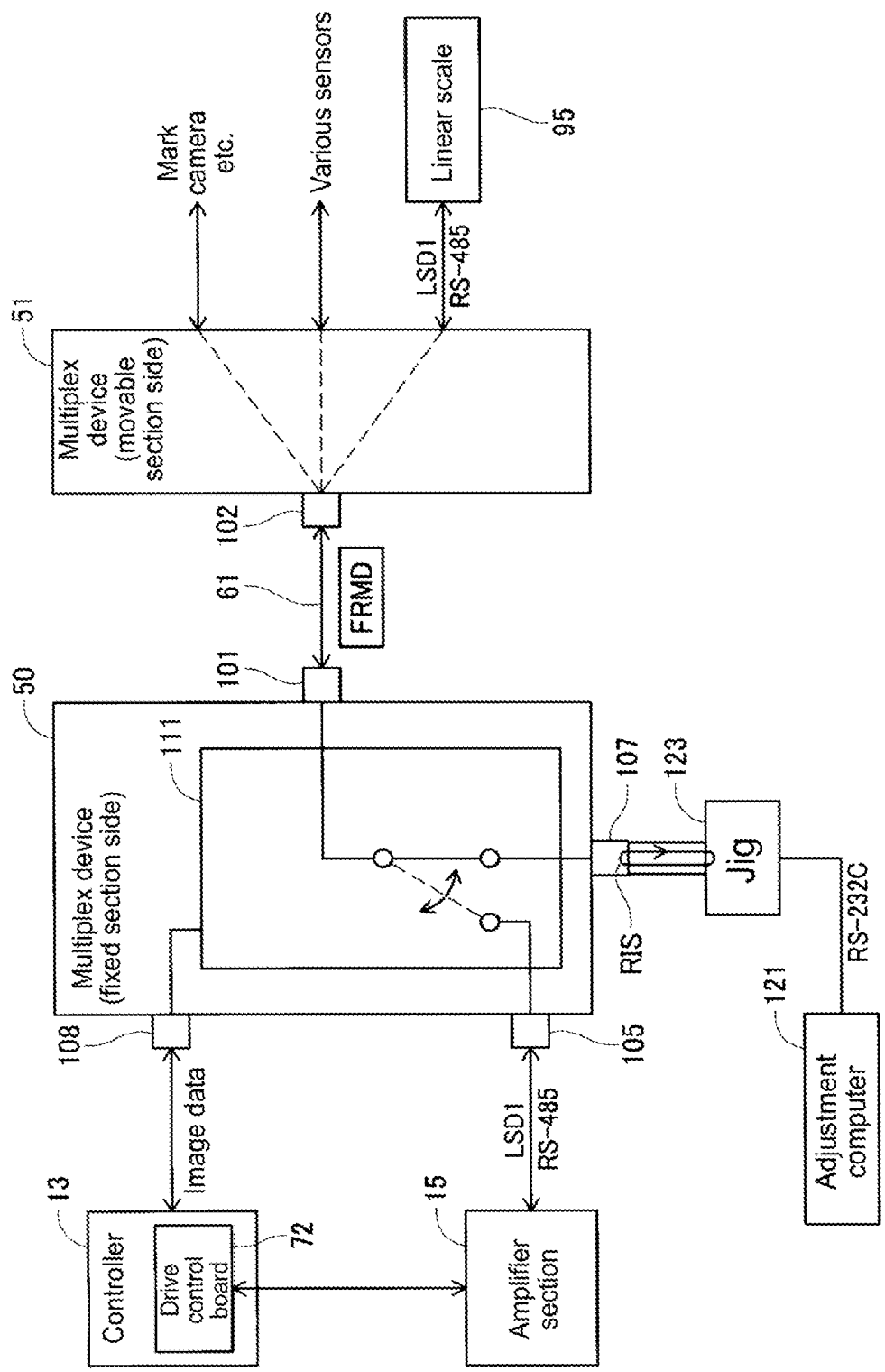
FIG. 7 is a block diagram illustrating a state in which an adjustment computer is connected to an adjustment connector.
Figure 8:
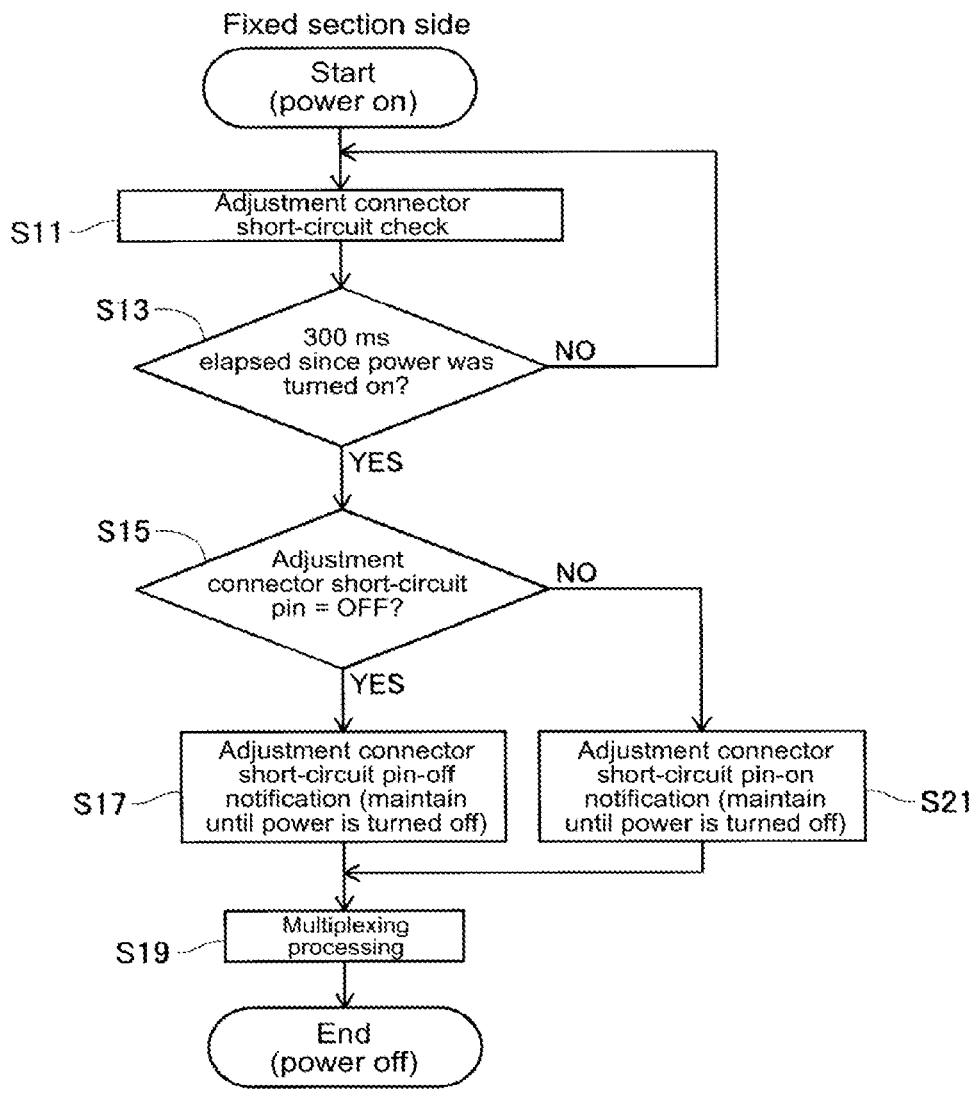
FIG. 8 is a flowchart showing processing performed by a multiplex device of the fixed section side.
Figure 9:
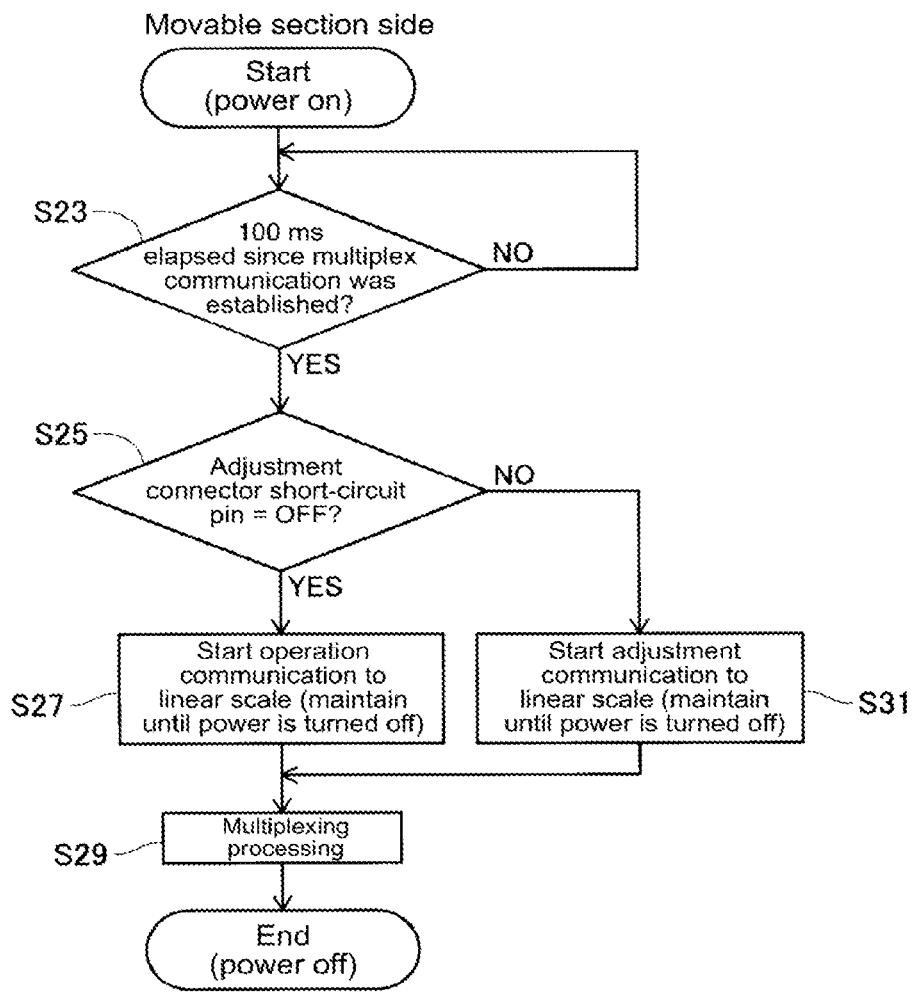
FIG. 9 is a flowchart showing processing performed by a multiplex device of the movable section side.

FIG. 7 shows a state in which adjustment computer 121 is connected to adjustment connector 107. FIG. 8 shows processing contents performed by the fixed section side multiplex device 50. FIG. 9 shows processing contents performed by the movable section side multiplex device 51. As shown in FIG. 7, adjustment computer 121 according to the present embodiment is connected to adjustment connector 107 via jig 123, and performs communication conforming to the RS-232C standard. An application program for setting linear scale 95, for example, is installed on adjustment computer 121. The user performs adjustment of linear scale 95 by operating adjustment computer 121 and starting the application program. The position signal measuring device of the present application is not limited to a personal computer, and other information processing devices such as a server can be employed.

Jig 123 includes, for example, a D-SUB9 pin interface conforming to the RS-232C standard as an interface connected to adjustment computer 121. Jig 123 is connected to adjustment connector 107. Adjustment connector 107 is provided with multiple (for example, nine) connecting pins connected to jig 123. Jig 123 is connected to adjustment connector 107 to short-circuit, for example, two of the multiple connection pins of adjustment connector 107. Jig 123, at a stage when connected to adjustment connector 107, may be provided with wiring for connecting the two connecting pins to short-circuit them. Alternatively, jig 123 may be provided with a relay that turns on and off based on a control signal from adjustment computer 121 or adjustment connector 107 to short-circuit the two connecting pins. As a result, as shown in FIG. 7, loop signal RIS is transmitted to adjustment connector 107 between two of the multiple connection pins connected to jig 123. Upon detecting the generation of loop signal RIS, switching section 115 detects that adjustment computer 121 has been connected to adjustment connector 107. Then, switching section 115 connects multiplex connecting section 101 and adjustment connector 107. Note that, the number of connecting pins for short-circuiting adjustment connector 107 is not limited to two, and may be three or more.

Therefore, adjustment connector 107 of the present embodiment has multiple connecting pins. Switching section 115 detects that adjustment computer 121 is connected to adjustment connector 107 based on the transmission of loop signal RIS between at least two of the multiple connection pins. Accordingly, switching section 115 is able to connect multiplex connecting section 101 and adjustment connector 107 in response to loop signal RIS flowing between the two connection pins.

Next, processing of multiplex device 50 will be described with reference to FIG. 8. Processing of FIG. 8 is performed by, for example, FPGA 111. In the following description, "processing performed by a logical circuit of FPGA 111 (such as switching section 115)" and "processing realized by performing programs by a CPU or the like provided in FPGA 111" are simply referred to as "processing performed by multiplex device 50".

For example, when the power switch of mounting device 10 is turned on and power is supplied, multiplex device 50 starts the processing shown in FIG. 8. Further, multiplex device 50 starts the processing shown in FIG. 8 and also starts communication line establishment processing with multiplex device 51.

When processing of FIG. 8 is started, multiplex device 50 detects whether adjustment connector 107 is short-circuited (step 11 of FIG. 8). In the following description, step is abbreviated to S. As described above, when jig 123 is connected to adjustment connector 107 and loop signal RIS flows to the connecting pins of adjustment connector 107, switching section 115 of multiplex device 50 detects the short circuit of adjustment connector 107.

Next, multiplex device 50 determines whether 300 ms has elapsed since the power switch was turned on and the power was supplied, that is, since multiplex device 50 was started up (S13). If 300 ms has not elapsed (S13: no), multiplex device 50 repeatedly performs the processing of S11. That is, multiplex device 50 tries to detect loop signal RIS for 300 ms after the starting, and determines whether the operation state is the normal operation state or the adjustment state. Therefore, the time used for the determination in S13 is not limited to 300 ms, and is appropriately changed in accordance with the time for which the detection of loop signal RIS is to be continued after the starting of multiplex device 50 or the activation time of another device (such as amplifier section 15).

If 300 ms have elapsed since the starting (S13: yes), multiplex device 50 determines whether the short-circuit of adjustment connector 107 was detected in S11, that is, whether loop signal RIS was detected (S15). If loop signal RIS was not detected in S11 (S15: yes), multiplex device 50 notifies multiplex device 51 of the short circuit information (pin-off notification) indicating that adjustment connector 107 is not short-circuited (S17). As a result, multiplex device 51 determines that it is only necessary to switch to the normal operation state without switching to the adjustment state for adjusting linear scale 95 device based on the notification from multiplex device 50, as will be described later. Multiplex device 50 waits for the communication line of communication cable 61 to be established, for example, and performs the notification of the short circuit information via communication cable 61. Note that, multiplex device 50 may be provided with a communication means for notifying multiplex device 51 of the short circuit information, separately from communication cable 61.

Further, switching section 115 connects multiplex connecting section 101 and adjustment connector 107. As a result, when the multiplexing processing of S19 is started, multiplex device 50 multiplexes linear scale signal LSD1 inputted from amplifier section 15 to amplifier connecting section 105 into frame data FRMD and transmits it. Further, multiplex device 50 cancels the multiplexing of frame data FRMD inputted via multiplexing connecting section 101, and outputs the canceled linear scale signal LSD1 from amplifier connecting section 105 to amplifier section 15. That is, linear scale signal LSD1 is transmitted between amplifier section 15 and linear scale 95 by communication conforming to the RS-485 standard.

Also, multiplex device 50 holds the short circuit information indicating that the power switch is not short-circuited until the power supply is stopped (for example, until the power switch is turned off). As a result, once activated, multiplex device 50 retains the same short circuit information (that is, the operation state or the adjustment state). For example, when linear scale 95 is set so as not to be able to switch from the operation state to the adjustment state during startup (for example, when operation is not guaranteed), multiplex device 50 can suppress the occurrence of a problem such as instability of operation of linear scale 95 by holding the same short circuit information during the startup.

When S17 is performed, multiplex device 50 performs multiplexing processing (S19). Here, mounting device 10 is in normal operation. Multiplex device 50 transmits data related to the mounting operation of mounting device 10 by multiplex communication. That is, normal mounting operation is started. Multiplex device 50 continues the multiplexing processing of S19 until, for example, the power switch is turned off.

On the other hand, if loop signal RIS was not detected in S11 (S15: no), multiplex device 50 notifies multiplex device 51 of the short circuit information (pin-on notification) indicating that adjustment connector 107 is short-circuited (S21). As a result, multiplex device 51 switches to an adjustment state in which adjustment of linear scale 95 is performed in response to a notification from multiplex device 50, as described later. Further, multiplex device 50 holds the short circuit information indicating that there is a short circuit until the power supply is stopped.

Further, switching section 115 connects multiplex connecting section 101 and adjustment connector 107. As a result, when the multiplexing processing of S19 is started, multiplex device 50 converts adjustment data AD (for example, control commands) inputted from adjustment computer 121 to adjustment connector 107 by protocol converter 117, and multiplexes the converted adjustment data AD into frame data FRMD and transmits it. Also, multiplex device 50 cancels the multiplexing of frame data FRMD inputted via multiplexing connecting section 101, and the canceled adjustment data AD is converted by protocol converter 117. Multiplex device 50 outputs the converted adjustment data AD from adjustment connector 107 to adjustment computer 121. That is, adjustment data AD is transmitted between adjustment computer 121 and linear scale 95 by communication conforming to the RS-485 standard (partially converted to the RS-232C standard).

When S21 is performed, multiplex device 50 performs multiplexing processing (S19). Here, mounting device 10 enters the adjustment state and stops transmitting data relating to the device operation, for example. Multiplex device 50 multiplexes adjustment data AD input from adjustment computer 121 and transmits the multiplexed adjustment data AD to linear scale 95. Also, multiplex device 50 outputs adjustment data AD received from linear scale 95 to adjustment computer 121. As a result, the user can operate adjustment computer 121 to perform adjustment work such as setting of the gain of linear scale 95 via multiplex communication.

Note that, in an example described above, switching section 115 of multiplex device 50 determines whether adjustment computer 121 is connected to adjustment connector 107, that is, whether multiplexing connecting section 101 and adjustment connector 107 are connected to each other based on loop signal RIS detected by jig 123 (S15). On the other hand, switching section 115 may detect that adjustment computer 121 is connected to adjustment connector 107 by using another method. For example, switching section 115 of multiplex device 50 may detect that adjustment computer 121 is connected to adjustment connector 107 based on control commands of the industrial network (MECHATROLINK [®]-III, or the like) described above. First, the user connects adjustment computer 121 to adjustment connector 107. Next, the user operates an input interface (such as a touchscreen panel) connected to controller 13, and transmits control commands indicating the connection of adjustment computer 121 from control board 74 functioning as a master of the industrial network to controller connecting section 108. Then, switching section 115 detects the connection of adjustment computer 121 based on the control commands received from control board 74, and connects multiplex connecting section 101 and adjustment connector 107. Note that, in this case, jig 123 may not be provided with wiring for short-circuiting.

Accordingly, switching section 115 connects multiplex connecting section 101 to adjustment connector 107 based on control commands transmitted from the master in the industrial network. Therefore, the switching of switching section 115 can be controlled by control commands of the industrial network.

Linear scale 95 may also be connected to an industrial network using, for example, protocol converters such as gateways. In this case, controller 13 can perform periodic status checks on linear scale 95 by, for example, industrial network control commands. For example, when an abnormality occurs in linear scale 95, controller 13 may notify the user of the abnormality while switching the connection of switching section 115 with control commands. As a result, the user can connect adjustment computer 121 to adjustment connector 107 by recognizing the notification of the abnormality, and quickly start the adjustment operation.

Alternatively, switching section 115 may detect that adjustment computer 121 is connected to adjustment connector 107 based on a switching commands received from adjustment computer 121 via RS-232C or the like. That is, whether there is a connection may be notified from adjustment computer 121 to multiplex device 50. Accordingly, the user can control the switching by switching section 115 by operating adjustment computer 121 and transmitting the switching command.

Further, the connection between adjustment computer 121 and adjustment connector 107 is not limited to a wired connection, and the connection may be made wirelessly. In this case, jig 123 may perform wireless communication with adjustment computer 121, for example, and may send loop signal RIS in accordance with the establishment of the wireless communication.

Next, the processing of multiplex device 51 on the movable section side will be described with reference to FIG. 9. Similar to multiplex device 50, multiplex device 51 starts the processing shown in FIG. 9, for example, when the power switch of mounting device 10 is turned on and power is supplied to multiplex device 51. Further, multiplex device 51 starts the processing shown in FIG. 9 and also starts communication line establishment processing with multiplex device 50.

When the processing of FIG. 9 is started, multiplex device 51 determines whether 100 ms has elapsed since the communication of the communication line with multiplex device 50 was established (S23). If 100 ms has not elapsed (S23: no), multiplex device 51 repeatedly performs the determination processing of S23. That is, multiplex device 51 establishes multiplex communication, and does not perform the processing of S25 and subsequent steps described later until 100 ms has elapsed after the establishment. As a result, multiplex device 51 is in a state of waiting to receive the short circuit information from multiplex device 50. Therefore, the time of 100 ms in S23 is appropriately changed in accordance with the time required to establish communication and the time required to detect a short circuit on the multiplex device 50 side.

When 100 ms has elapsed after the establishment of the communication (S23: yes), multiplex device 51 determines whether the short circuit information described above has been received from multiplex device 50 via the multiplex communication (S25). When it is determined that multiplex device 51 has received the short circuit information (pin-off notification) indicating that adjustment connector 107 is not short-circuited (S25: yes), multiplex device 51 switches to the normal operation state (S27). Multiplex device 51 starts communication of the normal operation state with linear scale 95 (S27). Further, multiplex device 51 holds the short circuit information indicating that the power supply is not short-circuited until the power supply is stopped. As a result, once activated, multiplex device 51 retains the same short circuit information (that is, the operation state or the adjustment state).

When S27 is performed, multiplex device 51 performs multiplexing processing (S29). Here, mounting device 10 is in normal operation. Multiplex device 51 outputs linear scale signal LSD1 received from multiplex device 50 to linear scale 95, multiplexes linear scale signal LSD1 inputted from linear scale 95, and transmits the multiplexed signal to multiplex device 50. Multiplex device 51 continues the multiplexing processing of S29 until, for example, the power switch is turned off.

On the other hand, when it is determined that multiplex device 51 has received the short circuit information (pin-on notification) indicating that adjustment connector 107 is short-circuited (S25: no), multiplex device 51 switches to the adjustment state (S31). Linear scale 95 switches to the adjustment state. Multiplex device 51 holds the short circuit information indicating that there is a short circuit until the power supply is stopped.

When S31 is performed, multiplex device 51 performs multiplexing processing (S29). Here, mounting device 10 is in the adjustment state. Multiplex device 51 transmits adjustment data AD between linear scale 95 and adjustment computer 121. Thus, adjustment of linear scale 95 is performed.

Use of Multiplex Device 50 as a Protocol Converter

Figure 10:
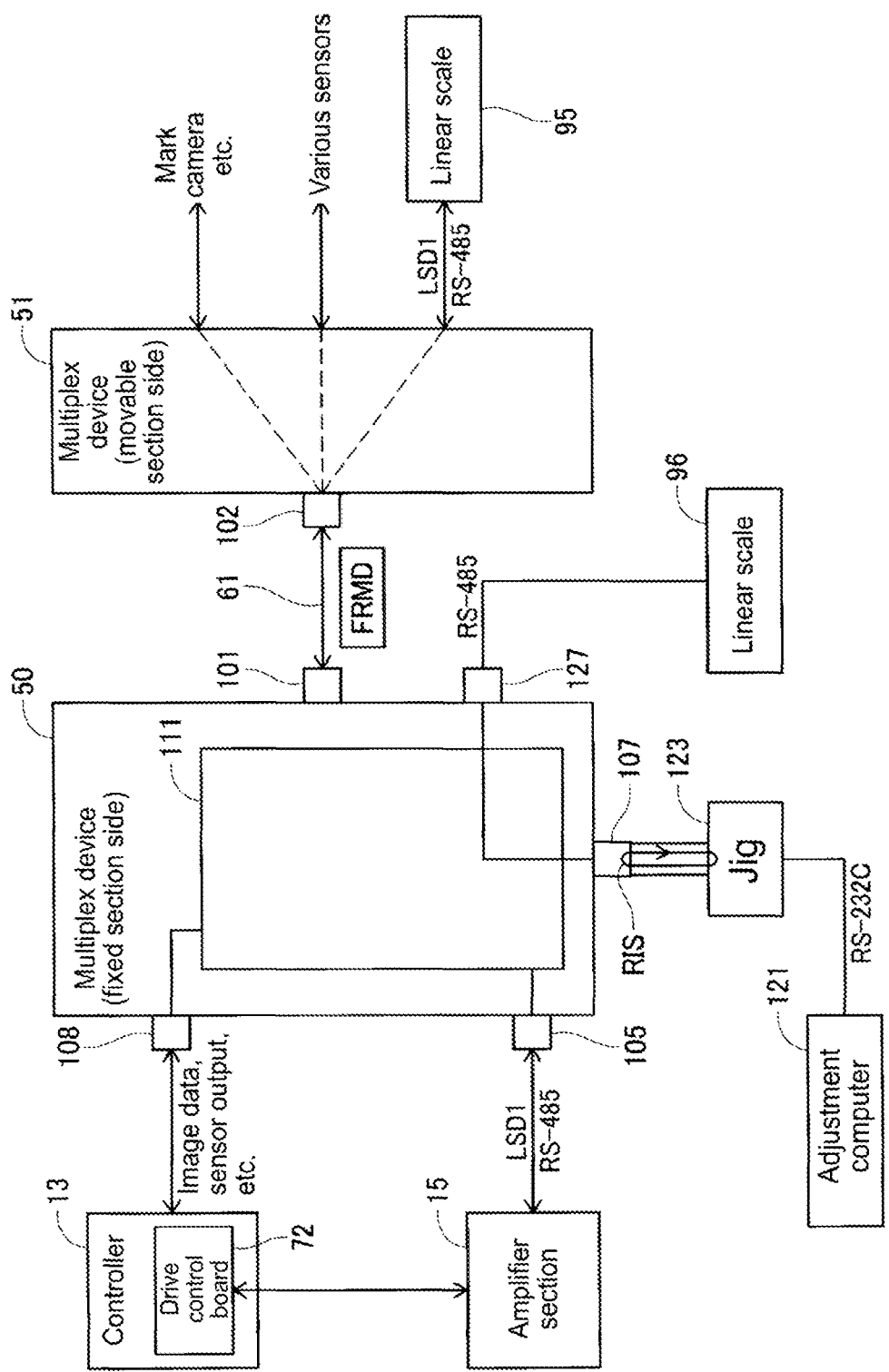
FIG. 10 is a block diagram showing a connection state of an alternative mounting device.

Note that, in an example above, switching section 115 is used for adjusting linear scale 95 connected to the multiplex communication, but may be used for adjusting linear scale 96 of X-axis slide mechanism 23 not connected to the multiplex communication. For example, as shown in FIG. 10, multiplex device 50 may include connector 127 for connecting linear scale 96. When detecting that linear scale 96 is connected to connector 127, switching section 115 may connect connector 127 and adjustment connector 107. Switching section 115 may detect the connection of linear scale 96 by short-circuiting the connection pins, or by communication with linear scale 96, similar to adjustment connector 107. Switching section 115 may detect the connection of linear scale 96 based on a control command by the industrial network or a switching command from adjustment computer 121. Then, in response to the connection between connector 127 and adjustment connector 107 by switching section 115, protocol converter 117 converts the communication of the RS-232C standard between adjustment computer 121 and adjustment connector 107 into communication of the RS-485 standard between linear scale 96 and connector 127. As a result, multiplex device 50 can be used as a protocol-convertor for linear scale 96 for which linear scale signal LSD2 is not transmitted by multiplexing communication, that is, which is not connected to multiplexing communication. The user can adjust linear scale 96 from adjustment computer 121 via multiplex device 50.

Sampling Frequency of Multiplexing Processing

Here, for example, the communication rate of linear scale signal LSD1 may be changed in the middle of communication depending on the specifications of amplifier section 15 and linear scale 95. In this case, for example, amplifier section 15, linear scale 95, and multiplex devices 50 and 51 of the present embodiment may include two types of modes: a high-speed mode in which linear scale signal LSD1 is communicated at high speed, and a low-speed mode in which linear scale signal LSD1 is communicated at low speed.

For example, in the initial state in which the power is turned on (that is, in the initial stage in the above-described operation state) multiplex devices 50 and 51 are in the low-speed mode for performing low-speed communication. Multiplex devices 50 and 51 are in a state of switching to a high-speed mode for performing high-speed communication or a state of maintaining a low-speed mode according to a predetermined condition. Here, the predetermined condition is, for example, a condition for detecting a control command transmitted from amplifier section 15 to linear scale 95 by multiplex devices 50 and 51. In the communication of linear scale signal LSD1, multiplex devices 50 and 51 detect a speed switching command instructing the switching of the communication speed as a control command transmitted from amplifier section 15 to linear scale 95.

For example, amplifier section 15 performs setting of an initial value necessary for executing low-speed communication on linear scale 95 after activation. When the setting of the initial value or the like is completed, amplifier section 15 starts low-speed communication. Amplifier section 15 inquires whether linear scale 95 can support the high-speed mode while performing low-speed communication with linear scale 95. Amplifier section 15 inquires of the version or the like of linear scale 95 to determine whether the high-speed mode can be supported. Amplifier section 15, when linear scale 95 detects that it is impossible to support the high-speed mode, continues low-speed communication. Also, when detecting that linear scale 95 is capable of supporting the high-speed mode, amplifier section 15 transmits a speed switching command for switching from the low-speed mode to the high-speed mode. Amplifier section 15, with respect to the transmission of the speed switching command, when receiving a normal response from linear scale 95, performs setting or the like of the initial value necessary to perform high-speed communication to linear scale 95. When the setting of the initial value or the like is completed, amplifier section 15 starts high-speed communication.

On the other hand, when detecting the speed switching command transmitted from amplifier section 15, multiplex devices 50 and 51 switch from the low-speed mode to the high-speed mode. Multiplex devices 50 and 51 detect the speed switching command, and after a predetermined time has elapsed, the mode switches to the high-speed mode. The predetermined time is, for example, a time from the time when the speed switching command is transmitted from amplifier section 15 to linear scale 95 until the response of linear scale 95 reaches amplifier section 15. That is, multiplex devices 50 and 51 wait for the time required for amplifier section 15 to shift from the low-speed mode to the high-speed mode. As a result, multiplex devices 50 and 51 can suppress the occurrence of data corruption and the like by matching the timing at which high-speed communication is started with amplifier section 15 and the like, and can appropriately switch to the high-speed mode.

Further, when shifting to the high-speed mode, multiplex devices 50 and 51 set a sampling period corresponding to the communication speed of high-speed communication. For example, multiplexing processing section 113 of multiplex device 50 (see FIG. 6), in a case of the operation state described above, samples and captures linear scale signal LSD1 transmitted from the amplifier section 15 based on a predetermined sampling period. Multiplex processing section 113 samples adjustment data AD transmitted from adjustment computer 121 based on a predetermined sampling cycle and captures adjustment data AD in the adjustment state described above. In order to appropriately detect linear scale signal LSD1 and adjustment data AD, the sampling period needs to be shortened as the speed increases, for example.

Therefore, multiplex processing section 113 of multiplex device 50 performs control to shorten the sampling period for capturing linear scale signal LSD1 and adjustment data AD in accordance with the switching from the low-speed mode to the high-speed mode, for example. As a result, multiplex device 50 can sample linear scale signal LSD1 and adjustment data AD, which are transmitted and received by high-speed communication, by multiplexing processing section 113, and appropriately multiplex linear scale signal AD and adjustment data AD. Note that, multiplex device 51 on the movable section side can perform multiplexing processing by performing sampling similar to that of multiplex device 50. Therefore, in the following description, mainly multiplex device 50 will be described, and description of multiplex device 51 is omitted as appropriate. Further, multiplexing processing of adjustment data AD can be performed in the same manner as multiplexing processing of linear scale signal LSD1. That is, the multiplexing processing described below can be applied to communication of adjustment data AD between adjustment computer 121 and linear scale 95, as well as communication of linear scale signal LSD1 between amplifier section 15 and linear scale 95. Therefore, in the following description, mainly linear scale signal LSD1 is described, and description of adjustment data AD is omitted as appropriate.

When switching to the high-speed mode, multiplex device 50 changes the output duration time, the timeout time, the error detection processing, and the like. The output duration referred to here is a duration for continuously outputting one piece data of linear scale signal LSD1 from decoding processing section 114 of multiplex device 50 to amplifier section 15. The time for continuously outputting one piece of data is, for example, a time required to transmit a high-level signal when one-bit data of linear scale signal LSD1 is represented by a high-level signal. The output duration of one piece of data becomes shorter as, for example, the communication speed increases. Further, the timeout time is a time used as a determination criterion required for detecting no input as an error by multiplex device 50 when linear scale signal LSD1 cannot be input from amplifier section 15 to multiplex device 50 for a predetermined period of time. The timeout period needs to be shortened as the communication speed is increased. Further, for example, the processing speed of error detection required in the low-speed mode and the high-speed mode may be different, and the content and the method of optimal error detection processing may be different. That is, if the communication speed is different, the error detection processing to be used may be different. Therefore, error detection processing is changed between the low-speed mode and the high-speed mode.

As described above, multiplex device 50 can appropriately sample and multiplex linear scale signal LSD1 communicated at two or more different communication speeds by changing the sampling period, outputting duration, and the like in accordance with the detected switching commands between amplifier section 15 and linear scale 95.

Sampling with the Same Sampling Period

In descriptions above, multiplex device 50 switches between the low-speed mode and the high-speed mode in response to the detection of the speed switching command, and changes the sampling period. On the other hand, multiplex device 50 may use the same sampling period in the low-speed mode and the high-speed mode. In descriptions below, the same sampling period is used for communication of linear scale signal LSD1 of a synchronous communication method.

FIG. 11 shows a case in which linear scale signal LSD1 is communicated by a synchronous communication method. Case 1 shows an example of a conventional method. Case 2 shows the low-speed mode. Case 3 shows the high-speed mode.

In cases 1, 2, and 3, as an example of a synchronous communication method, communication conforming to HDLC (High Level Data Link Control Procedure) is performed. For data encoding, for example, Manchester coding is used. Further, case 1 is for a 2 Mbps communication rate in both the initial state and the normal state. The initial state is, for example, a state at the start stage of communication, and is a state in which an initial value necessary for communication is set. The normal state is, for example, a state in which the setting of initial values is complete and transmission of linear scale signal LSD1 is performed. Numbers in parentheses indicate the duration of output of one piece of data, which is 500 ns ($=\frac{1}{2}$ Mbps). The output duration time is a time for which one piece of data is outputted from decoding processing section 114 of multiplex device 50 to amplifier section 15. Further, during sampling, the output duration is the same as the output duration of multiplex processing section 113.

The sampling period of case 1 is 16 MHz. Numbers in parentheses indicate the duration of output of one piece of data, which is 62.5 ns ($=\frac{1}{16}$ MHz). Also, the resolution for dividing one piece of data by the sampling period is eight. In case 1, one piece of data is processed (captured and so on) every eight samples.

Case 2 (low-speed mode) is for a 2 Mbps communication speed in both the initial state and the normal state. The output duration of one piece of data is 500 ns. Further, the sampling period of case 2 is 32 MHz, which is different from the sampling period of case 1. The time for one sample is 31.25 ns ($=\frac{1}{32}$ MHz). Also, the resolution for dividing one piece of data by the sampling period is eight. In case 2, the resolution is unified between the low-speed mode (case 2) and the high-speed mode (case 3). Further, multiplex processing section 113 of multiplex device 50 captures two (16 divisions) of eight divided pieces of data as one piece of data in the normal state of case 2. Further, decoding processing section 114 captures two (16 divisions) of eight divided pieces of data as one piece of data in the normal state of case 2. Thus, for example, multiplex processing section 113 captures one piece of data (high-level signal or the like) every 16 divisions (16 samples).

Case 3 (high-speed mode) is for a 2 Mbps communication speed in the initial state. The output duration of one piece of data is 500 ns. On the other hand, in the normal state, the communication rate is a 4 Mbps communication rate. The output duration time for one piece of data is 250 ns ($=\frac{1}{4}$ Mbps). Further, the sampling period of case 3 is 32 MHz, which is the same as the sampling period of case 2. In other words, the sampling periods of case 2 and 3 are the same at 32 MHz, even though the communication speeds in the normal states differ (case 3 is faster). The same sampling period (32 MHz) is 16 times the communication rate (2 Mbps) in the normal state of case 2. Also, the same sampling period (32 MHz) is eight times the communication rate (4 Mbps) in the normal state of case 3. That is, multiplex processing section 113 uses, as a sampling period, values of the same period (32 MHz) capable of sampling an integral multiple (16 times, 8 times) of the communication speed (2 Mbps, 4 Mbps) in each of the linear scale signals LSD1 communicated at two or more different communication speeds (high-speed mode, low-speed mode).

The time for one sample in case 3 is the same as case 2, 31.25 ns ($=\frac{1}{32}$ MHz). Also, the resolution for dividing one piece of data by the sampling period is eight. In this case, multiplex processing section 113 captures the data divided by eight as one piece of data. Decoding processing section 114 outputs the data divided by eight as one piece of data. Thus, for example, multiplex processing section 113 captures one piece of data (high-level signal or the like) every eight divisions (eight samples). That is, data is captured in one half of the duration of the above-mentioned case 2.

Further, when the communication speeds of linear scale signal LSD1 and adjusting data AD are switched, and each of the communication speeds (2 Mbps, 4 Mbps) before and after the switching is an integral multiple (16 times, 8 times) of the same sampling period (32 MHz), multiplexing processing section 113 uses that sampling period (32 MHz) for sampling. Also, decoding processing section 114 sets the output duration (500 ns, 250 ns) for outputting one piece of data of linear scale signal LSD1 and adjustment data AD based on the ratio (16 times, 8 times) between the respective communication speeds and the sampling periods. As a result, linear scale signal LSD1 and adjustment data AD transmitted at different communication speeds can be sampled and multiplexed without changing the sampling period. In the above examples, a synchronous communication method has been described, but in an asynchronous communication method as well, by setting the sampling period and the outputting time, linear scale signal LSD1 and adjustment data AD can be sampled and multiplexed.

Note that, mounting device 10 is an example of a robot. Multiplex device 50 is an example of a multiplex device. Multiplex device 51 is an example of a movable side multiplex device. Control board 74 is an example of a master. Amplifier 82 is an example of an amplifier for a position signal output section. Linear scale 95 is an example of a position signal output section. Linear scale 96 is an example of a second position signal output section. Adjustment connector 107 is an example of a measuring device connecting section. Controller connecting section 108 is an example of a master connecting section. Adjustment computer 121 is an example of a position signal measuring device. Connector 127 is an example of a position signal output section connecting section. Y-axis slide mechanism 25 and head section 27 are examples of a movable section. Linear scale signal LSD1 is an example of a position signal.

The following effects are obtained according to the embodiment described in detail above. In one aspect of the present embodiment, switching section 115 connects multiplex connecting section 101 and amplifier connecting section 105 in an operating state. Further, switching section 115 connects multiplex connecting section 101 and adjustment connector 107 in response to detecting the connection between adjustment connector 107 and adjustment computer 121. Here, multiplex device 51 and Y-axis slide mechanism 25 can be miniaturized by saving wiring by multiplexing communication or the like. On the other hand, it is difficult to directly connect adjustment computer 121 and linear scale 95 due to the miniaturization of multiplex device 51 and Y-axis slide mechanism 25. For example, in order to connect adjustment computer 121 and linear scale 95, operations such as removing upper cover 1A shown in FIG. 1, removing the cover covering the surfaces of Y-axis slide mechanism 25 and head section 27, and disassembling multiplex device 51 and Y-axis slide mechanism 25 are required. On the other hand, with multiplex device 50 of the present embodiment, even when direct connection between linear scale 95 and adjustment computer 121 is difficult, linear scale 95 and adjustment computer 121 are connected by multiplex communication, thereby making it possible to adjust linear scale 95.

Note that, the present application is not limited to the above-mentioned embodiments, and various modifications and changes can be made within a range not departing from the spirit of the present application. For example, the wire used for communication cable 61 is not limited to an optical fiber cable, and may be a LAN cable or a USB cable. Also, the communication line connecting multiplex device 50 and multiplex device 51 is not limited to wired communication and may be wireless communication.

Further, multiplex device 50 does not have to include protocol converter 117. In this case, the protocol converter may be provided separately from multiplex device 50. Also, in an above embodiment, a case in which two communication speeds of a high-speed mode and a low-speed mode are employed as two or more different communication speeds is described, but the present disclosure is not limited to this, and three or more different communication speeds (low speed, medium speed, and high speed) may be employed.

Further, although not specifically mentioned in embodiments above, linear scales 95 and 96 may be, for example, an encoder for serially transmitting linear scale signals LSD1, LSD2 such as position data. Alternatively, linear scales 95 and 96 may be, for example, an encoder for transmitting pulses of phases A, B, and Z in parallel. Further, the position signal output section in the present disclosure is not limited to linear scale 95, and may be another device for outputting position information such as a rotary encoder. Also, in an embodiment above, as the robot of the present disclosure, an electronic component mounting device by which an electronic component is mounted on circuit board 8 is adopted, but the robot of the present disclosure is not limited to this. The robot of the present disclosure may be, for example, a machine tool for performing cutting or the like, or a device provided with a robot arm for gripping and moving a workpiece.

REFERENCE SIGNS LIST

10: mounting device (robot);
25: Y-axis slide mechanism (movable section);
27: head section (movable section);
50: multiplex device (multiplex devices);
51: multiplex device (movable side multiplex device);
61: communication cable;
74: control board (master);
95: linear scale (position signal output section);
96: linear scale (second position signal output section);
82: amplifier (position signal output section amplifier);
101: multiplex connecting section;
101: multiplex connecting section;
113: multiplex processing section;
107: adjustment connector (measuring device connecting section);
108: controller connecting section (master connecting section);
115: switching section;
117: protocol converter;
121: adjustment computer (position signal measuring device);
127: connector (position signal output section connecting section);
LSD1: linear scale signal (position signal);
RIS: loop signal

The invention claimed is:

1. A multiplex device, comprising:
a multiplex connecting section connected to a movable side multiplex device, the multiplex connecting section being configured to transmit a position signal outputted from a position signal output section connected to the movable side multiplex device by multiplexing communication with the movable side multiplex device;
an amplifier connecting section connected to a position signal output section amplifier, the amplifier connecting section being configured to transmit the position signal to the position signal output section amplifier;
a measuring device connecting section connected to a position signal measuring device; and
a switching section configured to switch from a connection between the multiplex connecting section and the position signal output section amplifier, and a connection between the multiplex connecting section and the position signal measuring device in accordance with detection of a connection between the measuring device connecting section and the position signal measuring device.

2. The multiplex device according to claim 1, wherein the switching section is configured to connect the multiplex connecting section and the amplifier connecting section in an operation state in which the position signal is transmitted between the position signal output section and the position signal output section amplifier via a first protocol, and to connect the multiplex connecting section and the measuring device connecting section in an adjustment state in which communication is performed from the position signal measuring device to the position signal output section via by a second protocol that is a communication protocol different from the first protocol so as to adjust a setting of the position signal output section.

3. The multiplex device according to claim 2, further comprising:
a protocol switching section configured to switch to and from the first protocol and the second protocol, the protocol switching section being configured to switch communication via the second protocol between the position signal measuring device and the measuring device connecting section to communication via the first protocol between the position signal output section and the multiplex connecting section in accordance with the switching section connecting the multiplex connecting section and the position signal measuring device.

4. The multiplex device according to claim 3, further comprising: a position signal output section connecting section to which a second position signal output section is connected,
wherein
the switching section is configured to connect the position signal output section connecting section and the measuring device connecting section in accordance with detection of a connection between the position signal detection section connecting section and the second position signal detection section, and
the protocol switching section is configured to switch communication via the second protocol between the position signal measuring device and the measuring device connecting section to communication via the first protocol between the second position signal output section and the position signal output section connecting section in accordance with the position signal output section connecting section and the measuring device connecting section being connected by the switching section.

5. The multiplex device according to claim 1, wherein the measuring device connecting section includes multiple connection pins, and the switching section is configured to detect that the position signal measuring device is connected to the measuring device connecting section based on a loop signal being transmitted between at least two of the multiple connection pins.

6. The multiplex device according to claim 1, further comprising:
a master connecting section configured to connect to a master configured to perform communication via an industrial network,
wherein
the switching section is configured to detect that the position signal measuring device is connected to the measuring device connecting section based on a control command transmitted from the master via the master connecting section.

7. The multiplex device according to claim 1, wherein the switching section is configured to detect that the position signal measuring device is connected to the measuring device connecting section based on a switching command transmitted from the position signal measuring device to the measuring device connecting section.

8. The multiplex device according to claim 1, further comprising:
a multiplex processing section configured to sample and multiplex multiplexing adjustment data transmitted between the position signal output section and the position signal measuring device, the adjustment data being transmitted by switching between two different communication speeds,
wherein
the multiplex processing section is further configured to sample the adjustment data transmitted from the position signal measuring device using a value of a same period capable of sampling an integral multiple of the two different communication speeds as a sampling period.

9. A robot configured to perform work based on operation of a movable section and transmit data related to the work using a multiplex device according to claim 1.

10. A robot comprising:
a movable section;
a position output section provided on the movable section and configured to output a position signal representing a position of the movable section;
a movable side multiple device provided on the movable section;
a communication cable connected to the movable side multiple device;
a multiplex connecting section connected to the communication cable and configured to transmit the position signal outputted from the position signal output section via multiplex communication with the movable side multiplex device;
an amplifier connecting section connected to the multiplex connecting device;
a position signal output section amplifier connected to the amplifier connection section;
a measuring device connecting section connected to the position signal measuring device; and
a switching section configured to switch from a connection between the multiplex connecting section and the position signal output section amplifier, and a connection between the multiplex connecting section and the position signal measuring device in accordance with detection of a connection between the position signal measuring device and the measuring device connecting section.

11. A method of switching a connection of a multiplex device including a multiplex connecting section connected to a movable side multiple device and configured to transmit a position signal outputted from a position signal output section connected to the movable side multiplex device by multiplexing communication with the movable side multiplex device, an amplifier connecting section connected to a position signal output section amplifier and configured to transmit the position signal to and from the position signal output section amplifier, and a measuring device connecting section connected to a position signal measuring device, the method comprising:
detecting whether the measuring device connecting section and the position signal measuring device are connected to each other; and
switching from a connection between the multiplex connecting section and the position signal output section amplifier, and a connection between the multiplex connecting section and the position signal measuring device in accordance with detection of a connection between the position signal measuring device and the measuring device connecting section.

\* \* \* \* \*